(12) United States Patent
Ho

(10) Patent No.: US 12,348,653 B2
(45) Date of Patent: Jul. 1, 2025

(54) METHOD AND SYSTEM FOR DECENTRALIZED IDENTITY GENERATION

(71) Applicant: Taisys Technologies Co., Ltd., Taipei (TW)

(72) Inventor: Chun Hsin Ho, Taipei (TW)

(73) Assignee: Taisys Technologies Co., Ltd., Taipei (TW)

( * ) Notice: Subject to any disclaimer, the term of this patent is extended or adjusted under 35 U.S.C. 154(b) by 265 days.

(21) Appl. No.: 18/195,436

(22) Filed: May 10, 2023

(65) Prior Publication Data

US 2024/0380619 A1   Nov. 14, 2024

(51) Int. Cl.
*H04L 29/06* (2006.01)
*G06F 21/64* (2013.01)
*H04L 9/00* (2022.01)
*H04W 12/47* (2021.01)

(52) U.S. Cl.
CPC .............. *H04L 9/50* (2022.05); *G06F 21/64* (2013.01); *H04W 12/47* (2021.01)

(58) Field of Classification Search
CPC ....... H04L 9/50; H04L 9/3239; H04L 9/3247; G06F 21/64; H04W 12/47
See application file for complete search history.

(56) References Cited

U.S. PATENT DOCUMENTS

| | | | | |
|---|---|---|---|---|
| 9,736,147 B1* | 8/2017 | Mead | ...... | G06F 21/31 |
| 2020/0394648 A1* | 12/2020 | Blackshear | ...... | H04L 63/12 |
| 2020/0396072 A1* | 12/2020 | Maurer | ...... | G06F 16/2379 |
| 2023/0206329 A1* | 6/2023 | Cella | ...... | G06Q 20/36 |
| 2023/0214925 A1* | 7/2023 | Cella | ...... | G06Q 30/06 |
| | | | | 705/37 |
| 2024/0171393 A1* | 5/2024 | Bathen | ...... | H04L 9/30 |
| 2024/0380619 A1* | 11/2024 | Ho | ...... | H04L 9/50 |

FOREIGN PATENT DOCUMENTS

KR   20190045753 A   5/2019

OTHER PUBLICATIONS

PCT SR from PCT/CN2023/096829, mailed Feb. 2, 2024.

* cited by examiner

*Primary Examiner* — Mahfuzur Rahman

(74) *Attorney, Agent, or Firm* — Demian K. Jackson; Jackson IPG PLLC

(57) ABSTRACT

The present invention provides a method for decentralized identity generation and a system thereof. The method includes the following steps: creating a Merkle tree having a Merkle root and a plurality of Merkle proofs; personalizing the Merkle proof into the SIM; uploading the Merkle root of the Merkle tree to a smart contract of a distributed ledger technology (DLT) platform; forming a digital wallet in a subscriber identity module (SIM), wherein the digital wallet is accessed by a key pair that consists of a private key and a public key; providing the personalized Merkle proof of the SIM to the smart contract of the DLT platform; and issuing an identity-based token to the digital wallet formed in the SIM based on the validity of the personalized Merkle proof.

16 Claims, 4 Drawing Sheets

METHOD AND SYSTEM FOR DECENTRALIZED IDENTITY GENERATION

FIELD OF THE INVENTION

The present invention relates to a method and a system for decentralized identity generation. More particularly, the present invention relates to a method and a system for decentralized identity generation in Web 3.0.

BACKGROUND OF THE INVENTION

Web 3.0, also known as the "Semantic Web", is the next generation of the World Wide Web that is currently being developed. It is a more advanced and intelligent version of the internet that aims to provide a more meaningful and personalized experience for users.

Unlike Web 2.0, which mainly focused on social media, user-generated content, and interactive web applications, Web 3.0 aims to make the internet more machine-readable and interconnected. This means that data and information can be easily accessed, shared, and processed by machines, allowing for a more seamless and automated experience.

Web 3.0 is characterized by the use of advanced technologies such as artificial intelligence, blockchain, and the Internet of Things (IoT) to enable a more decentralized and secure internet. The goal is to create a more transparent, trustworthy, and user-centric web that can better serve the needs of individuals and businesses alike.

Web 3.0 is still in its early stages of development, and there are several challenges that need to be addressed before it can become a mainstream reality. Here are some of the current problems that Web 3.0 needs to overcome:

1. Interoperability: One of the biggest challenges of Web 3.0 is creating a standard that allows different platforms and protocols to interact with each other. Currently, there are many different blockchains and decentralized applications that do not communicate with each other, which can lead to fragmentation and limited functionality.
2. Scalability: Another issue with Web 3.0 is the ability to scale decentralized applications to support millions of users. Currently, most blockchain platforms have limited capacity, which can lead to slow transaction speeds and high fees.
3. User Experience: While Web 3.0 promises a more secure and decentralized internet, the user experience can be complex and confusing for non-technical users. Improving the user interface and making Web 3.0 more user-friendly will be critical to its success.
4. Privacy: With Web 3.0's focus on decentralized applications and blockchain technology, privacy is a key concern. Developers need to find ways to protect user data and ensure that personal information is not misused or exposed.

The SIM card is considered the most widely used identity authentication device due to its ubiquity in mobile technology. With over 5 billion mobile phone users worldwide, most of whom use SIM cards, it is an essential component of modern communication. SIM cards are also widely used in other devices such as tablets, smartwatches, and even some laptops. SIM cards use a unique identification number and encryption to ensure secure communication and protect user privacy. Therefore, they play a crucial role in digital identity authentication, making them a ubiquitous and essential component of the modern digital ecosystem. decentralized identity generation is an emerging concept that aims to give users greater control over their personal information and reduce reliance on centralized authorities to verify their identity. SIM cards can play a crucial role in this context by serving as a decentralized identity generation device. SIM cards have unique identification numbers and cryptographic capabilities that can be used to verify the user's identity without relying on centralized authorities.

A truly decentralized identity solution would be a groundbreaking technological advancement, providing people with unparalleled control over their personal data. However, the lack of a centralized database of identities would present a significant challenge in guaranteeing the uniqueness and singularity of these identities. Despite this, there are exciting possibilities to explore. One such option is the integration of biometric data into identity management systems. Although biometrics offer numerous benefits, they are not without their drawbacks. For instance, using biometric data to create a unique identifier forces individuals to identify themselves as one and only one persona, which can lead to serious privacy concerns and irrevocable harm in the event of data breaches. Furthermore, access to biometric technologies is complicated and prohibitively expensive for widespread adoption, posing a significant obstacle to the global scalability of a biometric-based identity system.

Therefore, the present invention provides a method for decentralized identity generation by use of SIM cards, thereby allowing the users to be able to maintain control over their personal information, and reducing the risk of identity theft and fraud. Furthermore, the use of SIM cards can enable more secure and private communication and transactions between users, increasing trust in the digital ecosystem. As decentralized identity generation continues to evolve, SIM cards are likely to play an increasingly important role in ensuring the security and privacy of digital identity authentication.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims. The following presents a simplified summary of one or more aspects of the present disclosure to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

The present invention provides a solution not only to overcome the aforementioned problems of Web 3.0, but also to effectively achieve the desired goal of enhancing interoperability, scalability, user-friendliness, and privacy. The present invention further prevents Sybil attacks and enhances the security and privacy of digital identity authentication.

In one aspect, the present invention provides a method for decentralized identity generation which includes the following steps: creating a Merkle tree having a Merkle root and a plurality of Merkle proofs; personalizing the Merkle proof into the SIM; uploading the Merkle root of the Merkle tree to a smart contract of a distributed ledger technology (DLT) platform; forming a digital wallet in a subscriber identity module (SIM), wherein the digital wallet is accessed by a key pair that consists of a private key and a public key; providing the personalized Merkle proof of the SIM to the smart contract of the DLT platform; and issuing an identity-based token to the digital wallet formed in the SIM based on the validity of the personalized Merkle proof.

Preferably, the method further includes a step of: verifying validity of the SIM by a password generated by the SIM and sent via a bearer independent protocol (BIP) to an intermediary server.

Preferably, the method further includes a step of: checking whether a password received from a mobile device matches a password received from the SIM.

Preferably, the method further includes a step of: obtaining a hash value by hashing an identifier from the SIM and/or a mobile device.

Preferably, the hash value is used for the smart contract to verify the validity of the SIM.

Preferably, the method further includes the steps of: generating a mnemonic seed; creating a deterministic public/private key pair based on a private mnemonic code of the mnemonic seed; and generating a wallet address based on the deterministic public key.

Preferably, the SIM is a regular SIM, an embedded-SIM (eSIM), or a thin-film SIM.

In another aspect, the present invention provides a system for decentralized identity generation which includes: a Merkle tree managing unit, for creating a Merkle tree having a Merkle root and a plurality of Merkle proofs, for personalizing the Merkle proof into a subscriber identity module (SIM), and for uploading the Merkle root of the Merkle tree to a smart contract; a processing unit, for forming a digital wallet in the SIM, wherein the digital wallet is accessed by a key pair that consists of a private key and a public key; an intermediary server, network connected to the processing unit, for providing the personalized Merkle proof to the smart contract; and a distributed ledger technology (DLT) platform, network connected to the intermediary server, having a plurality of smart contracts executed thereon, wherein an identity-based token (IBT) is issued to the digital wallet formed in the SIM based on the validity of the personalized Merkle proof by the smart contracts.

Preferably, the intermediary server verifies the validity of the SIM by a password generated by the SIM and sent via a bearer independent protocol (BIP).

Preferably, the intermediary server checks whether a password received from a mobile device matches a password received from the SIM to verify the validity of the SIM.

Preferably, the processing unit obtains a hash value by hashing an identifier from the SIM and/or a mobile device, and sends the hash value to the intermediary server.

Preferably, the hash value is sent to the DLT platform by the intermediary server for the smart contract of the DLT platform to verify the validity of the SIM.

Preferably, the hash value and the personalized Merkle proof are signed by the private key of the digital wallet.

Preferably, the processing unit generates a wallet address based on the public key.

Preferably, the intermediary server generates a wallet address based on the public key.

Preferably, the SIM is a regular SIM, an embedded-SIM (eSIM), or a thin-film SIM.

Preferably, the processing unit is an application in the SIM.

DETAILED DESCRIPTION OF THE PREFERRED EMBODIMENTS

Figure 1:
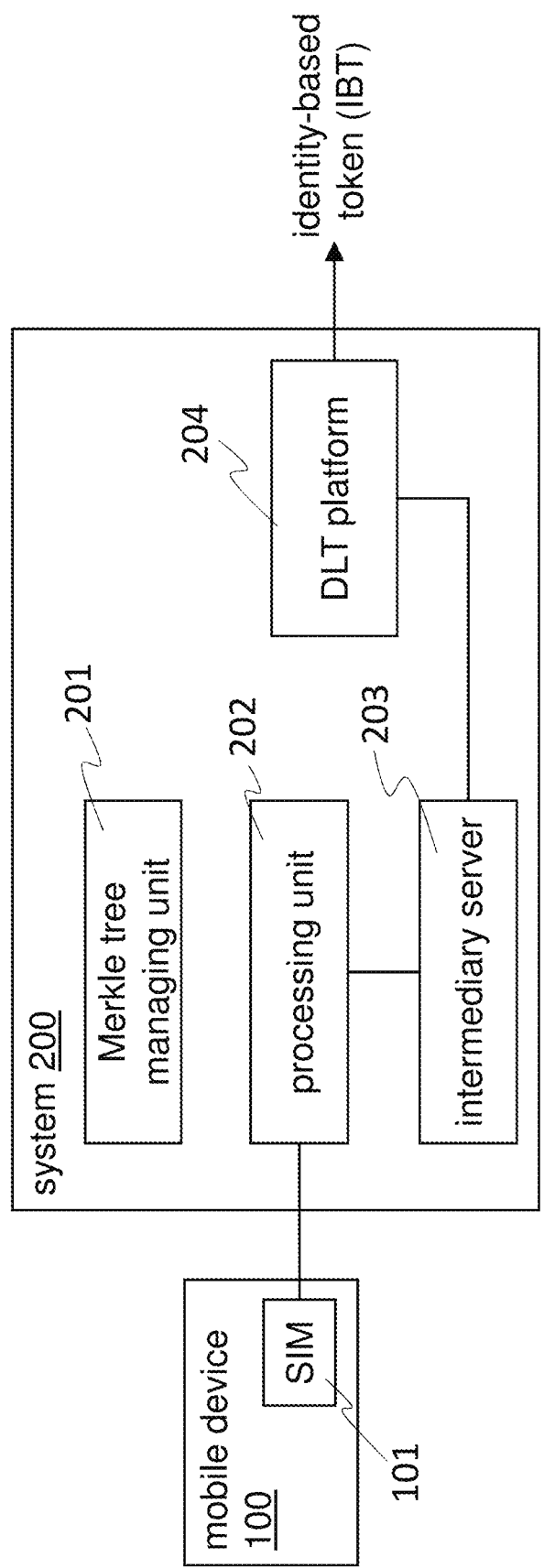
FIG. 1 is a block diagram illustrating major components of a system for decentralized identity generation according to an embodiment of the present invention.

The present invention will now be described more specifically with reference to the following embodiments. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

The utilization of Subscriber Identity Module (SIM) is a fundamental component in the cellular networks. However, it is essential to acknowledge that the present invention is not limited to the usage of SIM only, as other identity modules designed for cellular networks can also be implemented. There are various kinds of SIM cards, each catering to different types of mobile communication terminals, such as Global System for Mobile communication (GSM), Code Division Multiple Access (CDMA) and even for both systems. The SIM card comes in diverse sizes, ranging from the traditional Mini-SIM, which is the standard size in most smartphones, to the Micro-SIM, a smaller version which was popularized by Apple's iPhone 4. Moreover, the Nano-SIM, an even smaller size was introduced with the iPhone 5. Soft SIM, on the other hand, is a virtual SIM card, which is securely stored on a device's memory or storage, allowing users to switch carriers without physically changing the SIM card. Multi-SIM is another variant, which allows a SIM card to be used with multiple devices or accounts simultaneously, facilitating seamless switching between devices or carriers as per the user's needs. The Universal Integrated Circuit Card (UICC) is a smart card that is commonly used in mobile devices for secure storage of subscriber information, cryptographic keys, and other data. Furthermore, the embedded SIM (eSIM) is a programmable SIM card that is built into a device, enabling it to be activated remotely by a carrier. eSIMs are gradually gaining popularity in connected devices such as smartwatches and Internet of Things (IoT) devices. The above-mentioned types of SIM cards are the most commonly used; however, several other variations and form factors of SIM cards are available in the market catering to the diverse needs of the users.

International Mobile Equipment Identity (IMEI) is a unique identification number assigned to mobile phones and other cellular devices. It is typically stored in the device's memory, rather than on a card. It is used by cellular networks to identify valid devices and can also be used to block stolen or lost devices from accessing the network. SIM cards do have their own unique identification numbers known as International Mobile Subscriber Identity (IMSI) numbers. The IMSI is used by the cellular network to identify the subscriber and authenticate their access to the network. The IMSI can be linked to the device's IMEI for additional security and authentication purposes.

The IMSI is typically 15 digits long and consists of three parts: the mobile country code (MCC), the mobile network code (MNC), and the mobile subscriber identification number (MSIN). The MCC and MNC together identify the network operator, while the MSIN identifies the subscriber within that network. While the IMSI is primarily used for network authentication, it can also be used for location tracking.

Bearer Independent Protocol (BIP) is a wireless communication protocol used in mobile networks that allows for the transfer of information independent of the underlying network bearer. In other words, it allows the same service or application to work seamlessly over different types of wireless networks (e.g., 2G, 3G, 4G, 5G) without requiring any modification. BIP is typically used for sending SMS messages, multimedia messages (MMS), and other mobile data services. By using BIP, mobile network operators can provide a more efficient and cost-effective way of delivering these services, as well as ensuring a better user experience. BIP operates at the application layer of the open systems interconnection (OSI) model and uses a series of protocols and standards to ensure interoperability across different wireless networks. It is widely used in GSM and UMTS networks, and is also being adopted in newer 4G and 5G networks.

A Merkle tree, also known as a hash tree, is a data structure used in cryptography and computer science to efficiently verify the integrity of large data sets. The Merkle tree works by breaking a large data set into smaller, fixed-sized blocks called "leaves". Each leaf is then hashed (using a cryptographic hash function like SHA-256) to create a fixed-length value, which is stored at the bottom of the tree. These hashed leaves are then combined in pairs and hashed again, creating a new level of nodes in the tree. This process is repeated until there is only one hash left, known as the "root hash" or "Merkle root". The Merkle root represents a summary of all the data in the tree. By comparing the Merkle root of two Merkle trees, we can quickly and efficiently verify whether the data sets are identical. This is achieved by comparing only a small portion of the data, as opposed to comparing the entire data set. This property makes Merkle trees useful for verifying the integrity of large data sets in a decentralized system, such as blockchain technology.

In a distributed ledger technology (DLT) platform such as blockchain, Merkle trees are used to ensure the integrity and validity of transactions in the network. The Merkle tree allows nodes in the network to quickly verify the authenticity of a block of transactions by comparing the block's Merkle root to the Merkle root of the previous block. If the roots match, it is a sign that the transactions in the block are valid and have not been tampered with. Merkle trees are also used in distributed file systems, such as the InterPlanetary File System (IPFS), which is a peer-to-peer file-sharing system that allows users to access and share files without relying on a centralized server. In IPFS, Merkle trees are used to ensure the integrity and availability of stored files. Overall, Merkle trees are a crucial component of Web 3.0's decentralized infrastructure, helping to ensure data integrity, security, and trust in the network.

FIG. 1 is a block diagram illustrating major components of a system 200 for decentralized identity generation according to an embodiment of the present invention. As shown, the system 200 includes a Merkle tree managing unit 201; a processing unit 202; an intermediary server 203 which is network connected to the processing unit 202; and an distributed ledger technology (DLT) platform 204 which is network connected to the intermediary server 203.

Figure 2:
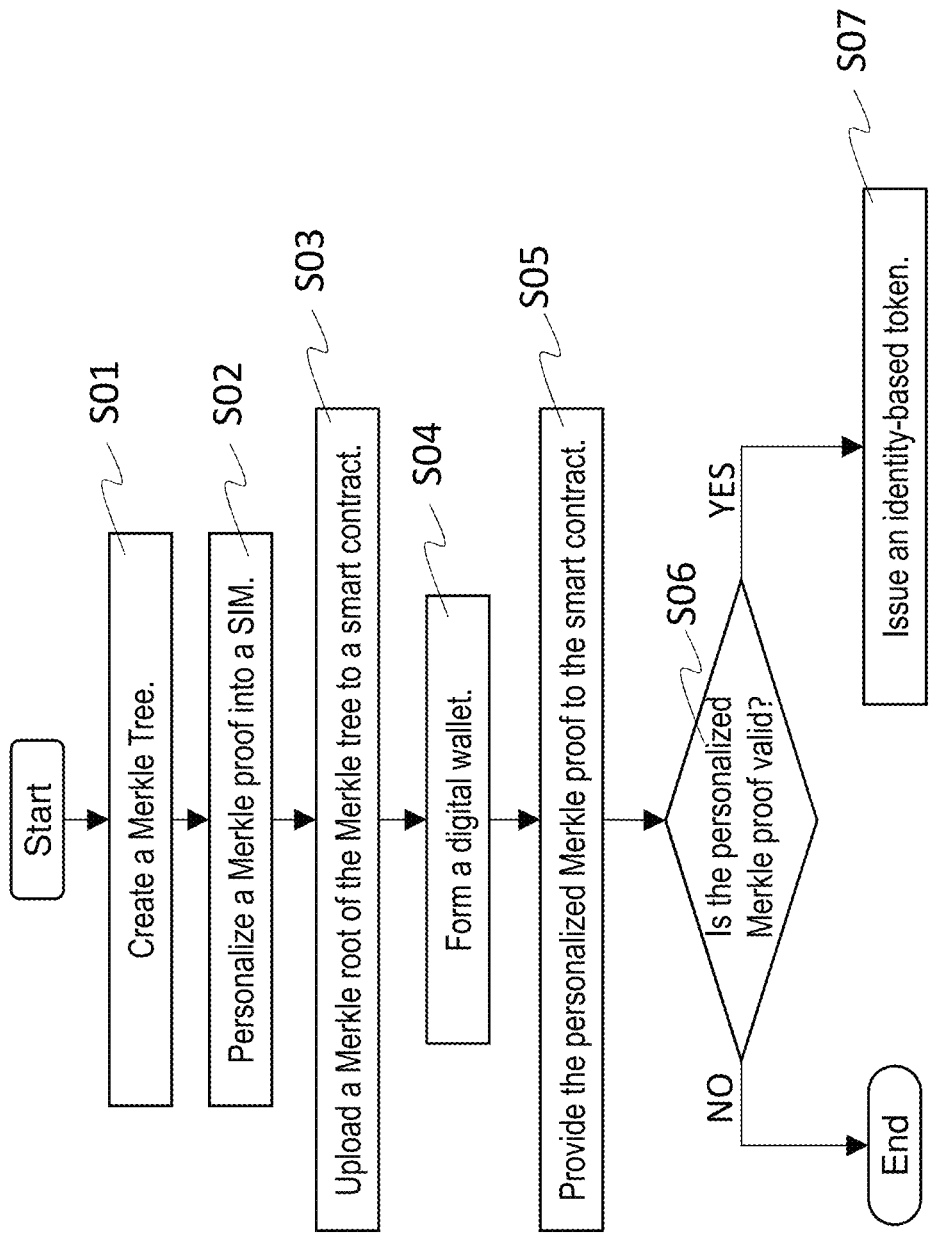
FIG. 2 is a flowchart illustrating a method for decentralized identity generation according to an embodiment of the present invention.
Figure 3:
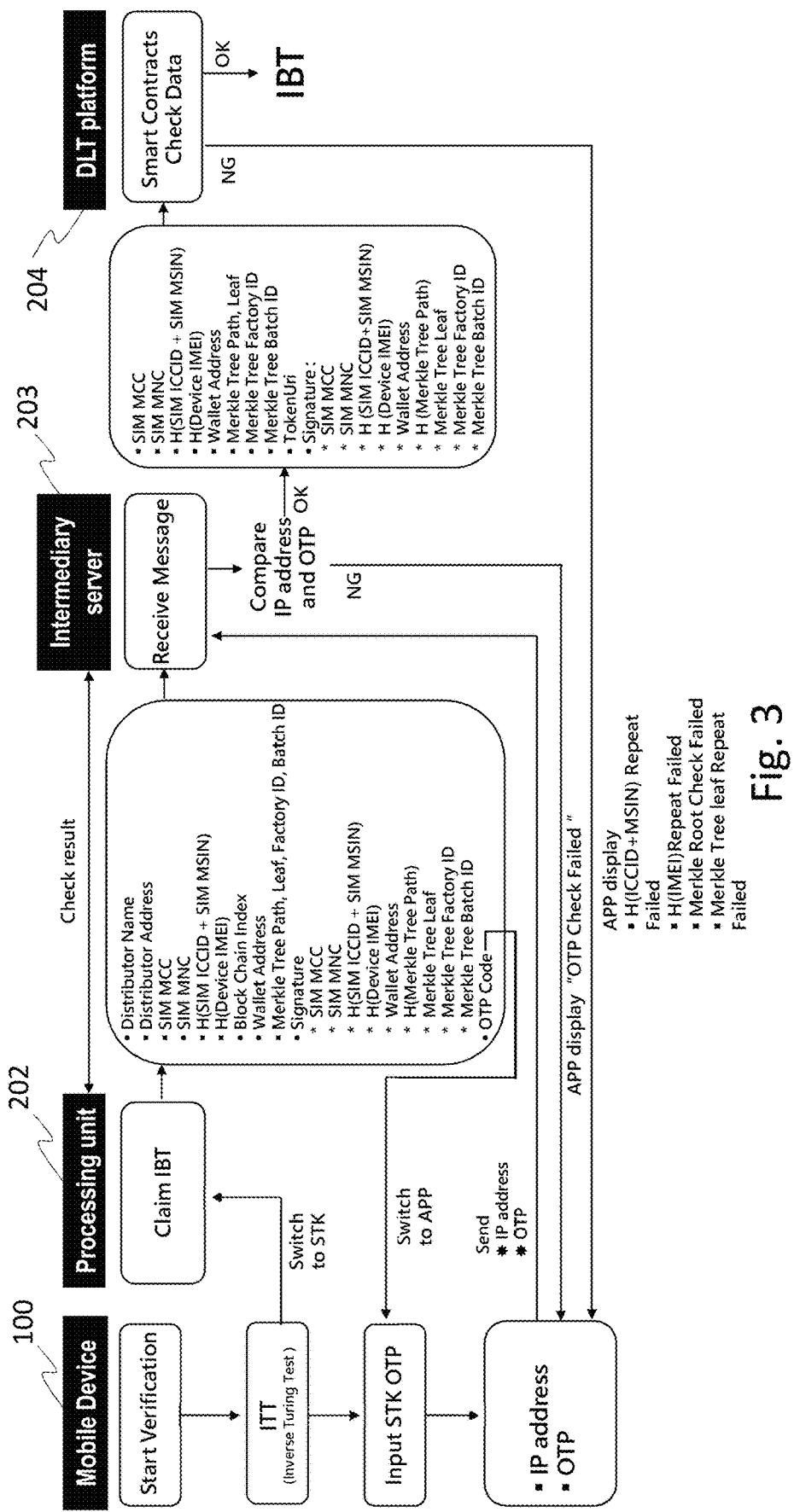
FIG. 3 is a conceptual overview of the method according to an embodiment of the present invention.
Figure 4:
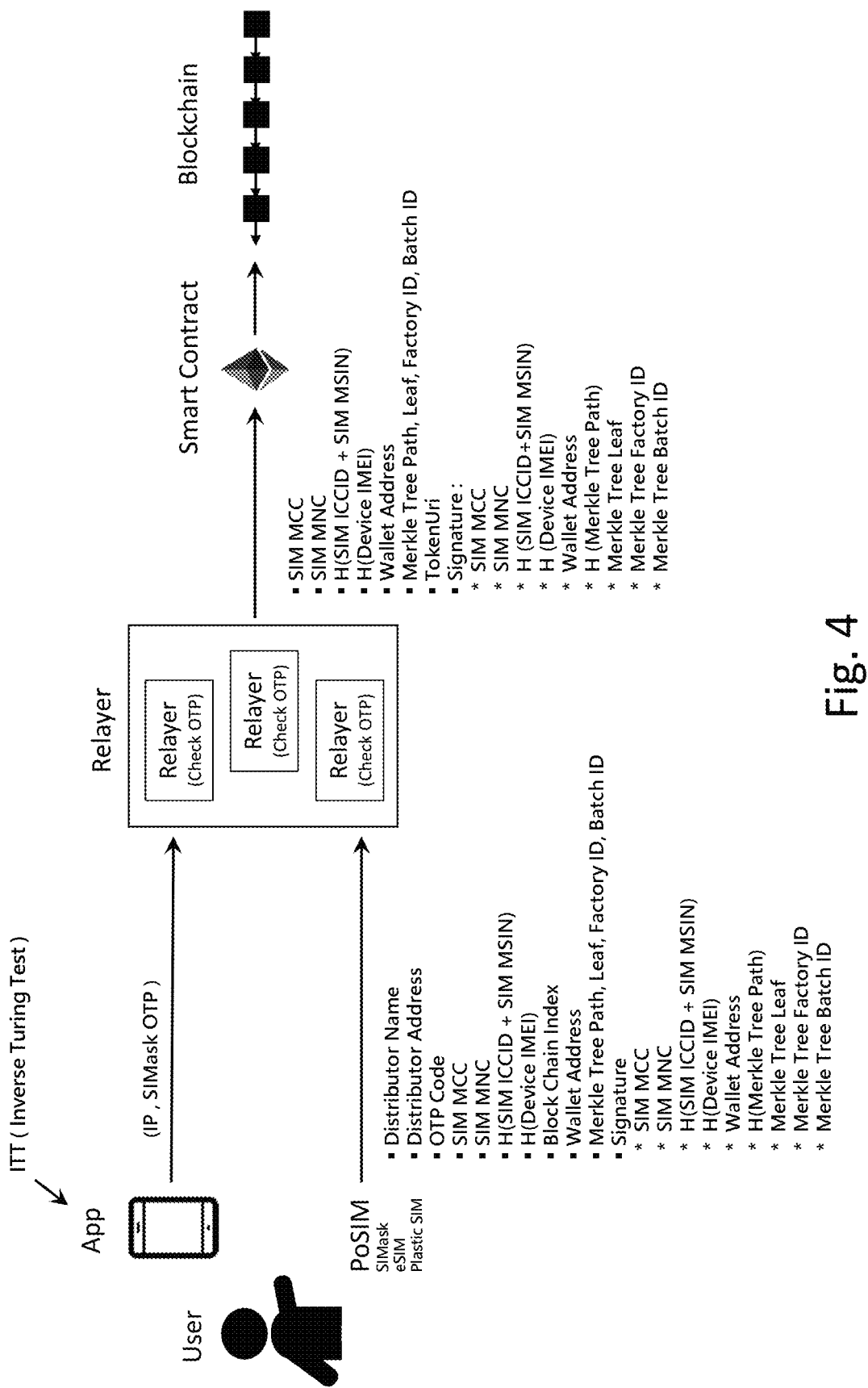
FIG. 4 is another conceptual overview of the method according to an embodiment of the present invention.

To gain a comprehensive comprehension of how the system 200 accomplishes decentralized identity generation, kindly refer to FIGS. 2 to 4. FIG. 2 is a flowchart illustrating a method for decentralized identity generation according to an embodiment of the present invention. FIG. 3 is a conceptual overview of the method according to an embodiment of the present invention. FIG. 4 is another conceptual overview of the method according to an embodiment of the present invention.

The present invention offers an innovative method for generating decentralized identities, paving the way for a more secure and reliable identity management system. The method involves several steps that ensure the integrity and confidentiality of the identity information. The first step, is to create a Merkle tree having a Merkle root and multiple Merkle proofs. This initial step, step S01, is performed by the Merkle tree managing unit 201. Next, in step S02, the Merkle proof is personalized into the SIM 101 by the Merkle tree managing unit 201. Moving on to step S03, the Merkle root of the Merkle tree is uploaded to a smart contract of a distributed ledger technology (DLT) platform 204 by the Merkle tree managing unit 201, a crucial step that provides additional layers of security to the process. Then, in step S04, a digital wallet is formed in a subscriber identity module (SIM) 101. The digital wallet is accessed using a key pair consisting of a private key and a public key, which provides a high level of security and confidentiality.

Step S05 is a critical step in the process of decentralized identity generation. It involves the provision of the personalized Merkle proof of the SIM 101, which was obtained in step S03, to the smart contract of the DLT platform 204. This step is carried out by the intermediary server 203, which ensures that the personalized Merkle proof is securely transmitted to the DLT platform. The DLT platform 204 is a highly advanced technology that incorporates multiple smart contracts executed concurrently.

The verification of the validity of the personalized Merkle proof takes place in step S06, where the smart contracts analyze the authenticity of the provided proof. The verification process involves complex mathematical algorithms that compare the Merkle proof of the SIM 101 to the Merkle root uploaded to the DLT platform 204 in step S04. If the personalized Merkle proof is validated as genuine and accurate, the smart contracts will continue the process. However, if the proof fails to meet the standards of the verification process, the smart contracts will terminate the process and the identity-based token will not be issued.

Finally, in step S07, an identity-based token is issued to the digital wallet formed in the SIM 101 only if the personalized Merkle proof is verified to be valid by the smart contracts. This token represents the identity of the user, which can be used to access various services and systems. It is worth noting that the issuance of the identity-based token is a highly secure and reliable process, thanks to the advanced technology employed in this decentralized identity generation system. Through these sequential steps, the present invention offers a reliable and effective way of achieving decentralized identity generation.

In order to ensure a secure decentralized identity generation process, it is essential to bind the SIM 101 and mobile device 100 together. This is achieved through a rigorous verification process, which involves using a password generated by the SIM 101 and sent via a secure bearer independent protocol (BIP) to an intermediary server 203. By using a one-time password (OTP), the verification process becomes even more secure, as the password can only be used once and cannot be replicated. To further enhance the security, the user is prompted to enter the password onto their mobile device 100, which is then sent to the intermediary server 203. The intermediary server 203 then verifies whether the password received from the SIM 101 matches the one received from the mobile device 100, ensuring that only authorized users can access the digital wallet containing the identity data. This process also verifies the binding between the SIM 101 and the mobile device 100, preventing any potential Sybil attacks. The incorporation of human intervention in the verification process adds an additional layer of security, making the authentication process robust and secure. As a result, the decentralized identity generation process is protected against any potential threats, ensuring the confidentiality, integrity, and availability of the identity data.

To verify the validity of the SIM 101, a hash value is obtained by hashing an identifier from the SIM 101 and/or a mobile device 100. Specifically speaking, the hash value is used for the smart contract to verify the validity of the SIM 101, ensuring the accuracy and reliability of the identity data. With the validation of the SIM 101 and the binding between the SIM 101 and the mobile device 100, the personalized Merkle proof of the SIM 101 is sent to the smart contract of the DLT platform 204 by the intermediary server 203 in step S05.

To create the digital wallet, the method includes generating a mnemonic seed and creating a deterministic public/private key pair based on a private mnemonic code of the mnemonic seed. A wallet address is then generated based on the deterministic public key. This process provides a high level of security and confidentiality for the digital wallet.

The personalized Merkle proof is carried out through a series of steps, starting with the retrieval of the international mobile subscriber identification (IMSI) code and integrated circuit card identity (ICCID) code from the SIM 101, and the international mobile equipment identity (IMEI) code from the mobile device 100. This information is then hashed to obtain a hash value, which is combined with a Merkle leaf of the Merkle tree. As aforementioned, the IMSI code includes a mobile country code (MCC), a mobile network code (MNC), and a mobile subscription identification number (MSIN). The validity of the personalized Merkle proof may be determined by comparing whether the MCC and MNC of the IMSI are consistent with a location area code (LAC) and a cell ID retrieved from the mobile device 100 in order to avoid roaming IMSIs. If the hash value is included in the blacklist stored in the smart contract or if the Merkle leaf does not exist in the Merkle Tree of the smart contract, then the personalized Merkle proof is considered invalid.

The SIM 101 is preferably a regular SIM, an embedded-SIM (eSIM), or a thin-film SIM. In conclusion, the present invention provides a comprehensive and innovative solution for decentralized identity generation, offering a new standard for identity management systems.

The system for decentralized identity generation provided by the present invention employs cutting-edge technologies to ensure robust security and reliable performance. The Merkle tree managing unit 201 is responsible for creating a Merkle tree, a hierarchical data structure that provides tamper-evident proof of data integrity, and personalizing the Merkle proof into a SIM 101, a secure hardware element that provides a trusted execution environment for the digital wallet. The processing unit 202, which can be an application residing in the SIM 101 such as SIM application Toolkit (STK), forms the digital wallet and generates a key pair consisting of a private key and a public key to access the wallet. The wallet address, derived from the public key, is generated either by the processing unit 202 or the intermediary server 203, which is network connected to the processing unit 202 and verifies the validity of the SIM 101 using a password generated by the SIM 101 and sent via a bearer independent protocol (BIP).

In order to ensure maximum security, the system employs multiple layers of authentication and verification. The intermediary server 203 checks whether the password received from the SIM 101 matches the one received from the mobile device 100, and the processing unit 202 obtains a hash value by hashing an identifier from the SIM 101 and/or a mobile device 100, which is then sent to the intermediary server 203 for further validation. The intermediary server 203 then sends the hash value and the personalized Merkle proof to the DLT platform 204, which executes a smart contract to verify the validity of the SIM 101. The hash value and the personalized Merkle proof are signed by the private key of the digital wallet to ensure their authenticity.

According to the present invention, the intermediary server 203 acts as a "Relayer" in Web 3.0 which is a key component for confining transactions based on the policies for regulation compliance or avoid attacks.

Overall, the system for decentralized identity generation provided by the present invention is a cutting-edge solution that employs state-of-the-art technologies to ensure maximum security and reliable performance. The combination of a Merkle tree, a SIM, a digital wallet, and a DLT platform provides a robust and tamper-evident method for generating decentralized identities that can be used for a wide range of applications, from secure communication to financial transactions.

It is to be understood that the specific order or hierarchy of steps in the methods disclosed is an illustration of exemplary processes and may be rearranged based upon design preferences. The accompanying method claims present elements of the various steps in a sample order, and are not meant to be limited to the specific order or hierarchy presented unless specifically recited therein.

Although embodiments have been described herein with respect to particular configurations and sequences of operations, it should be understood that alternative embodiments may add, omit, or change elements, operations and the like. Accordingly, the embodiments disclosed herein are meant to be examples and not limitations.

What is claimed is:

1. A method for decentralized identity generation, comprising the following steps:
creating a Merkle tree having a Merkle root and a plurality of Merkle proofs;
personalizing the Merkle proof into the SIM;

uploading the Merkle root of the Merkle tree to a smart contract of a distributed ledger technology (DLT) platform;

forming a digital wallet in a subscriber identity module (SIM), wherein the digital wallet is accessed by a key pair that consists of a private key and a public key;

providing the personalized Merkle proof of the SIM to the smart contract of the DLT platform; and issuing an identity-based token to the digital wallet formed in the SIM based on the validity of the personalized Merkle proof, wherein the digital wallet has a wallet address generated by the following steps:

generating a mnemonic seed;

creating a deterministic public/private key pair based on a private mnemonic code of the mnemonic seed; and generating a wallet address based on the deterministic public key.

2. The method according to claim 1, further comprising a step of: verifying validity of the SIM by a password generated by the SIM and sent via a bearer independent protocol (BIP) to an intermediary server.

3. The method according to claim 1, further comprising a step of: checking whether a password received from a mobile device matches a password received from the SIM.

4. The method according to claim 1, further comprising a step of: obtaining a hash value by hashing an identifier from the SIM and/or a mobile device.

5. The method according to claim 4, wherein the hash value is used for the smart contract to verify the validity of the SIM.

6. The method according to claim 1, wherein the SIM is a regular SIM, an embedded-SIM (eSIM), or a thin-film SIM.

7. A system for decentralized identity generation, comprising:

a Merkle tree managing unit, for creating a Merkle tree having a Merkle root and a plurality of Merkle proofs, for personalizing the Merkle proof into a subscriber identity module (SIM), and for uploading the Merkle root of the Merkle tree to a smart contract;

a processing unit, for forming a digital wallet in the SIM, wherein the digital wallet is accessed by a key pair that consists of a private key and a public key;

an intermediary server, network connected to the processing unit, for providing the personalized Merkle proof to the smart contract; and a distributed ledger technology (DLT) platform, network connected to the intermediary server, having a plurality of smart contracts executed thereon, wherein an identity-based token (IBT) is issued to the digital wallet formed in the SIM based on the validity of the personalized Merkle proof by the smart contracts.

8. The system according to claim 7, wherein the intermediary server verifies the validity of the SIM by a password generated by the SIM and sent via a bearer independent protocol (BIP).

9. The system according to claim 7, wherein the intermediary server checks whether a password received from a mobile device matches a password received from the SIM to verify the validity of the SIM.

10. The system according to claim 7, wherein the processing unit obtains a hash value by hashing an identifier from the SIM and/or a mobile device, and sends the hash value to the intermediary server.

11. The system according to claim 10, wherein the hash value is sent to the DLT platform by the intermediary server for the smart contract of the DLT platform to verify the validity of the SIM.

12. The system according to claim 10, wherein the hash value and the personalized Merkle proof are signed by the private key of the digital wallet.

13. The system according to claim 7, wherein the processing unit generates a wallet address based on the public key.

14. The system according to claim 7, wherein the intermediary server generates a wallet address based on the public key.

15. The system according to claim 7, wherein the SIM is a regular SIM, an embedded-SIM (eSIM), or a thin-film SIM.

16. The system according to claim 7, wherein the processing unit is an application in the SIM.

* * * * *